Patented May 6, 1924.

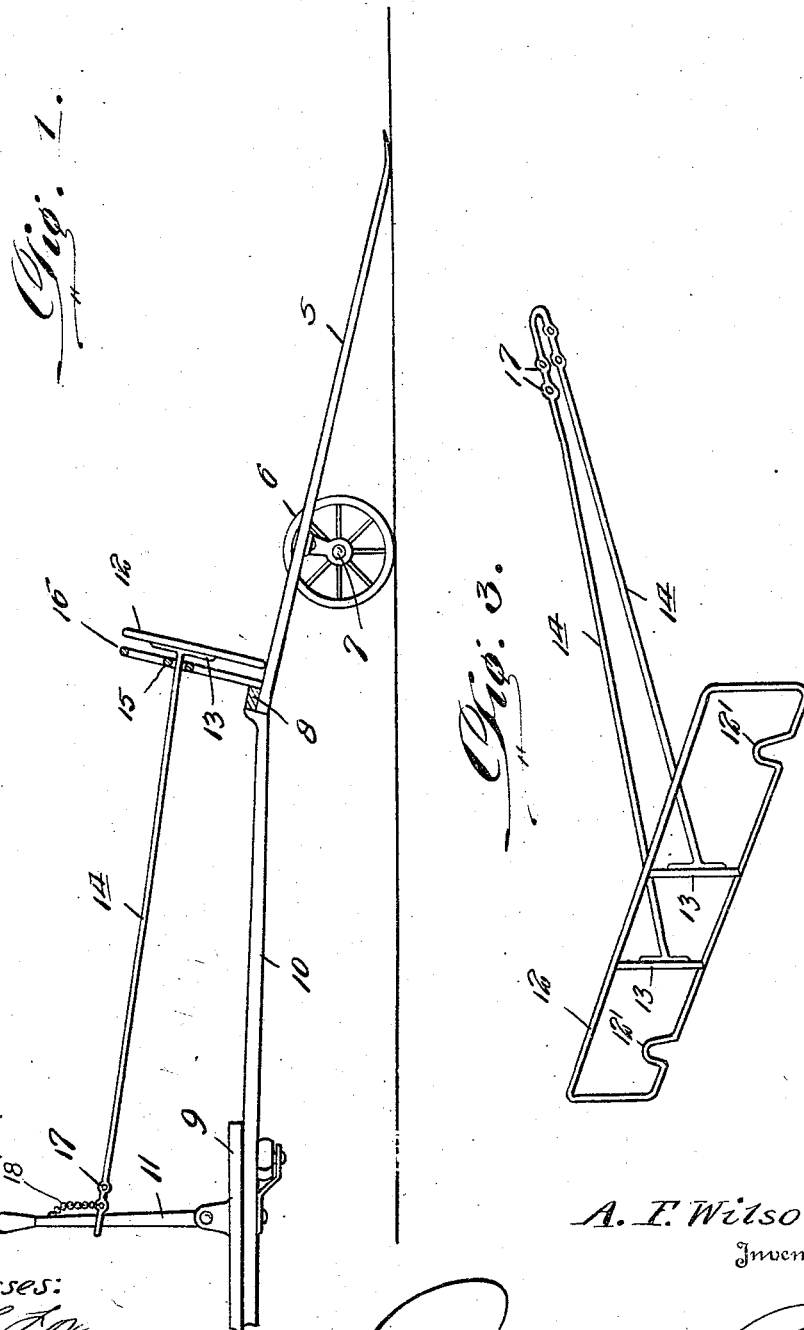

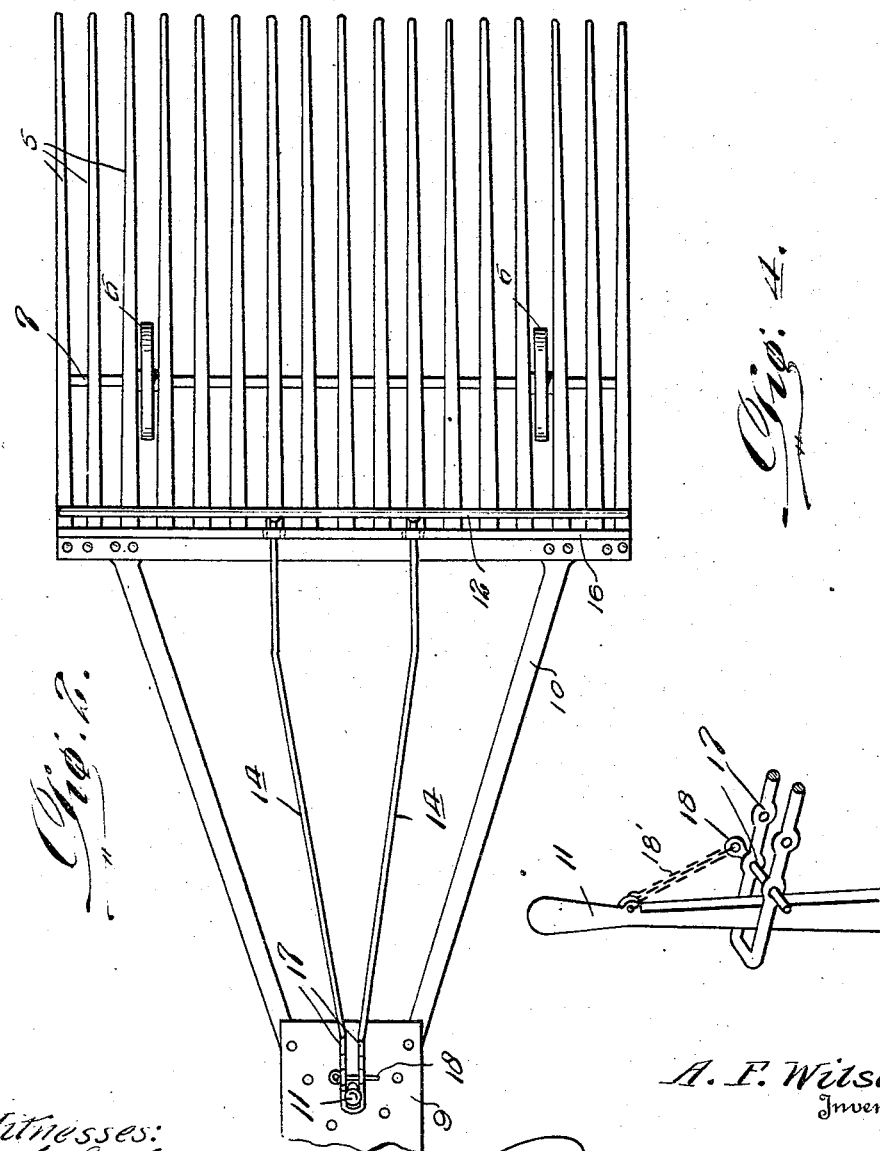

1,493,308

UNITED STATES PATENT OFFICE.

ALBERT F. WILSON, OF LA JARA, COLORADO.

HAY DISCHARGER FOR SWEEP RAKES.

Application filed February 26, 1923. Serial No. 621,220.

*To all whom it may concern:*

Be it known that I, ALBERT F. WILSON, a citizen of the United States, residing at La Jara, in the county of Conejos and State of Colorado, have invented certain new and useful Improvements in Hay Dischargers for Sweep Rakes, of which the following is a specification.

My invention relates to an attachment for sweep rakes wherein the hay gathered thereon may be effectively discharged therefrom by the operator of the rake without the usual necessity of employing an extra man for removing the hay from these rakes.

A further object of my invention resides in the provision of such device that is relatively simple in construction and is well adapted for ready application to sweep rakes of conventional types.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is a fragmentary side elevational view of a sweep rake with my discharger in position thereon.

Figure 2 is a top plan view thereof.

Figure 3 is a perspective of the hay discharger per se, and

Figure 4 is a perspective of the upper end of the usual rake raising and lowering lever together with one end of my hay discharger for more clearly disclosing the connection between this lever and the said discharger.

Referring to the drawings in detail and particularly to Figures 1 and 2 there is shown a sweep rake of conventional form embodying the usual downwardly sloping spaced rake teeth 5 supported adjacent their upper ends by ground wheels 6 upon a cross shaft or axle 7. As is now the case with sweep rakes of this type the inner ends of the teeth 5 are connected by a cross bar 8 which bar is, in turn, connected with the rake platform 9 by arm members 10, the platforms 9 of these rakes carrying a raising and lowering lever 11 for the teeth 5 of the rake.

My discharger per se comprises a frame 12 of substantially elongated rectangular configuration and normally positioned upon the top of the teeth 5 and at the rear ends thereof. This frame 12 consists of a single length of wire bent into the said shape and having a pair of rods 13 formed between the ends thereof. Connected to these rods by welding or the like are the inner ends of a pair of the inwardly extending and relatively elongated legs of a rod 14 the central portion thereof being formed into a U-bend and adapted for engagement over the operating lever of the sweep rake.

These ends of the rod 14 extend through openings 15 in a vertical frame 16 at the rear end of the teeth 5 of said rake.

The opposite side portions of the legs of the rod 14 are provided with a series of juxtaposed openings 17 through which a pin 18 may be inserted and when so positioned the pin is disposed transversely of the lever 11 and when the lever is swung it will encounter the pin and cause the rod 14 to move longitudinally in a rear or forward direction according to the direction in which the lever is swung.

In view of the above description it will at once be apparent that when my discharger is positioned as shown and it is desired to remove the hay from the rake the handle 11 may be extended forwardly for forcibly discharging the hay therefrom and by removing the pin 18 from the openings 17 within the arms 14, the lever 11 may be operated independently of said discharger when the pin 18 is removed. As a means for permitting the discharger frame 12 to pass over the projecting portions of the supporting wheels 6, the lower side thereof is formed with inwardly bent portions 12' clearly shown in Figure 3.

The chain 18' connected with the lever 11 and the pin 18 serves to support the bent end of the rod 14 in a predetermined relation with the lever.

In view of the above description it is believed that the advantages and operation of a sweep rake attachment of this character will be readily appreciated by those skilled in the art and although I have herein shown and described the preferred embodiment of my invention it is nevertheless to be understood that minor changes may be made therein without departing from the spirit and scope of my invention as claimed.

Having described my invention, what I claim and desire to secure by Letters Patent, is:—

In combination with a sweep rake, a discharge mechanism comprising a substantially rectangular frame mounted for sliding movement upon the tines of the rake and consisting of a continuous rod, the rod of the frame being provided at the lower side of the frame with upwardly arched portions adapted to move over the wheels of the rake, the frame being provided at points between the said arched portions with transversely disposed rod sections which connect at their ends with the opposite sides of the frame, and a V-shaped rod having its ends connected with the intermediate portions of the last mentioned rod sections and extended around the lever of the rake and provided with means for shackling the lever in operative connection with the said V-shaped rod and the discharging frame.

In testimony whereof I affix my signature.

ALBERT F. WILSON.